United States Patent
Ravishankar et al.

(10) Patent No.: US 6,778,509 B1
(45) Date of Patent: Aug. 17, 2004

(54) MAC LAYER PROTOCOL FOR A SATELLITE BASED PACKET SWITCHED SERVICES

(75) Inventors: Channasandra Ravishankar, Germantown, MD (US); Anthony Noerpel, Lovettsville, VA (US); Mahesh Kamath, New Delhi (IN); Abheek Saha, New Delhi (IN); James Hobza, Carlsbad, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 819 days.

(21) Appl. No.: 09/714,788

(22) Filed: Nov. 16, 2000

Related U.S. Application Data

(60) Provisional application No. 60/166,472, filed on Nov. 19, 1999, and provisional application No. 60/186,060, filed on Mar. 1, 2000.

(51) Int. Cl.[7] .................................................. H04B 7/212
(52) U.S. Cl. ....................................... 370/322; 370/348
(58) Field of Search ................................. 370/322, 324, 370/348, 354, 443, 445, 447, 466; 455/455, 466, 450, 428, 429

(56) References Cited

U.S. PATENT DOCUMENTS

| | | | | |
|---|---|---|---|---|
| 5,615,215 A | * | 3/1997 | Utting et al. ............... 370/337 |
| 5,717,830 A | * | 2/1998 | Sigler et al. ............. 455/426.1 |
| 5,896,376 A | * | 4/1999 | Alperovich et al. ........ 370/348 |
| 5,946,618 A | * | 8/1999 | Agre et al. ................. 455/428 |
| 6,094,429 A | * | 7/2000 | Blanchette et al. ......... 370/347 |
| 6,157,621 A | * | 12/2000 | Brown et al. ............... 370/310 |
| 6,438,386 B2 | * | 8/2002 | Joshi et al. ................. 455/515 |
| 6,469,992 B1 | * | 10/2002 | Schieder ..................... 370/329 |
| 6,532,225 B1 | * | 3/2003 | Chang et al. ............... 370/341 |
| 6,560,215 B1 | * | 5/2003 | Bloem et al. ............... 370/347 |

* cited by examiner

*Primary Examiner*—Wellington Chin
*Assistant Examiner*—Mark A Mais
(74) *Attorney, Agent, or Firm*—John T. Whelan

(57) ABSTRACT

An approach for minimizing response times in transporting traffic over a packet radio communication system is disclosed. A terminal transmits a packet resource request message that specifies user terminal information using a contention channel according to a prescribed protocol. A gateway station receives the packet resource request message and transmits an assignment message that specifies a channel assignment based upon the user terminal information, wherein the terminal is configured to transmit the packets over a channel is based on the channel assignment. This approach has particular applicability to a satellite communication system.

8 Claims, 10 Drawing Sheets

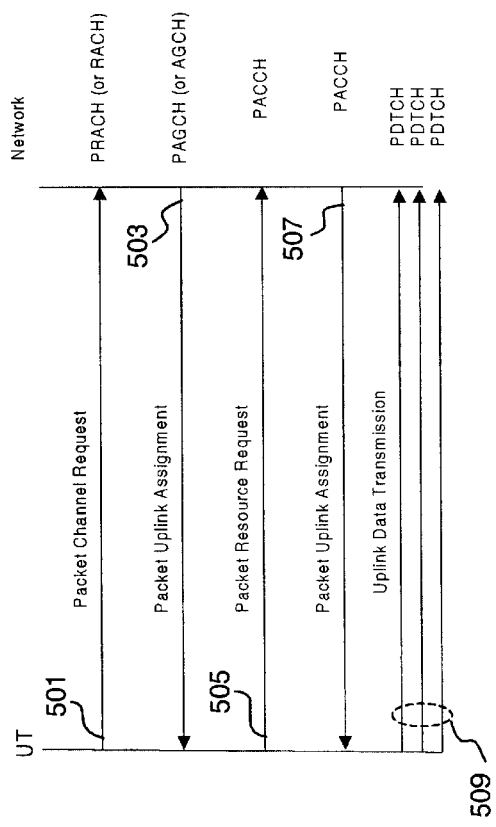
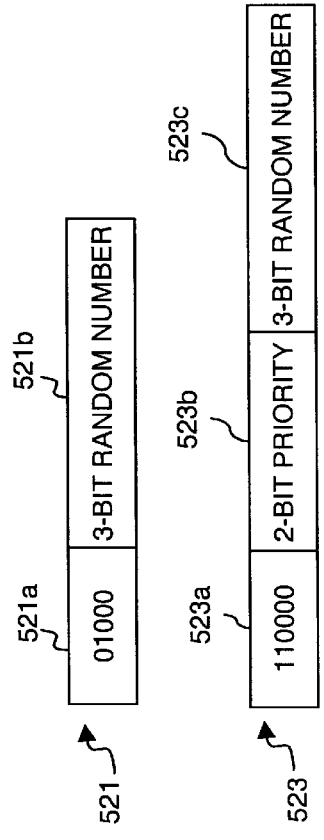
FIG. 5A
FIG. 5B PRIOR ART

MAC LAYER PROTOCOL FOR A SATELLITE BASED PACKET SWITCHED SERVICES

CROSS-REFERENCES TO RELATED APPLICATION

This application is related to, and claims the benefit of the earlier fling date of U.S. Provisional Patent Application (Ser. No. 60/166,472), filed Nov. 19, 1999, entitled "Improvement in Telecommunications," and U.S. Provisional Patent Application (Ser. No. 60/186,060), filed Mar. 1, 2000, entitled "MAC Layer Protocol for a Satellite Based Packet Switched Service"; all of which are incorporated herein by reference in their entirety.

BACKGROUND OF THE INVENTION

1. Field of the Invention

The present invention relates to radio communication systems, and is more particularly related to a satellite packet switched communication system utilizing a medium access control (MAC) protocol to establish a channel for packet transfer.

2. Discussion of the Background

Modern satellite communication systems provide a pervasive and reliable infrastructure to distribute voice, data, and video signals for global exchange and broadcast of information. These satellite communication systems have emerged as a viable option to terrestrial communication systems for carrying Internet traffic as well as telephony traffic. Another popular application is direct television broadcasting, which has provided a competitive alternative to cable television systems. Irrespective of the application, a satellite communication system must be designed to support the largest possible traffic capacity, which can translate to lower cost per telephone circuit, or television service, for example, and thus, to increased revenue for the system operator. In addition, satellite communication systems are required to exhibit user response times that are comparable to competing terrestrial systems. That is, the hosts that connect to a user terminal (UT) demand that the delay of the satellite system be minimized, thereby reducing user response time.

To provide packet switched services, a satellite communication system must employ a robust and efficient protocol stack, particularly at the physical, data link, and networking layers (in terms of the OSI (Opens Systems Interconnection) model). One approach has been to utilize the medium access control (MAC) and Radio Link Control (RLC) layer of the ETSI (European Telecommunications Standards Institute) GSM (Global Satellite Mobile Communications) GPRS (General Packet Radio Service) standard (e.g., GSM 03.64) to establish communication between satellite terminals and gateway stations. This standard defines the procedures that enable multiple user terminals to share a common transmission medium by providing contention resolution in the event of collisions. GSM, however, is a global standard that is promulgated by the ETSI for digital cellular terrestrial communication, and thus, is not optimized for a satellite communication system.

Because the MAC/RLC layer of the GSM GPRS standard is primarily focused on a terrestrial system, this conventional protocol has a number of drawbacks. One major drawback is that the protocol requires a two-phase access scheme to establish a communication channel. In the GPRS protocol, the terminal must transmit a packet channel request message in a slotted aloha channel. This packet channel request message is limited in length, containing only 8 or 11 bits. This length restricts the amount of information that can be conveyed; therefore, all the necessary user terminal information, such as the terminal ID, the terminal type (given that different terminal types might have different physical channel requirements), the reason for the packet channel request, the required capacity or the quality of service requirements, and etc. cannot be properly captured in such a small message length. The network needs the user terminal information to perform an uplink resource assignment. Thus, in response to the terminal's packet channel request message, the network transmits a packet uplink assignment message, assigning the terminal a single packet channel block simply to transmit the required information. This information is, subsequently, transmitted by the terminal to the network in the packet resource request message to which the network can finally respond to the terminal with the required resource assignment. The process of transmitting, first the packet channel request message in a slotted aloha channel, and second the packer resource request message in a single block assignment, is referred to as two stage access. This is the normal method of packet channel access by a terminal in GSM GPRS.

This two-phase access scheme is performed for every packet channel communication transmission. In a system with a one-way propagation delay of about 250 ms (which is typical of a satellite communication system), this approach introduces about 1 second of delay, excluding the processing delays before a packet resource can be assigned for the transmission of data. Such a scheme is acceptable in a system with short propagation delay; however, in a satellite communication system, this delay translates to significant increased user response times stemming from the protocol.

GSM GPRS protocol and other conventional protocols do not allow the UT or the network to transmit signalling control information and data within the same RLC block.

With respect to the Internet, the Transmission Control Protocol (TCP) and the Internet Protocol (IP) are the de facto standards and are used by all the major application layer protocols (e.g., FTP (File Transfer Protocol), HTTP (Hyper Text Transfer Protocol), and SMTP (Simple Mail Transfer Protocol).

In a system that provides a medium over which end-user applications use the TCP/IP, the inefficiencies of the two-phase access scheme is even more pronounced. Typically, data is segmented into numerous packets for transport over a TCP network. TCP is responsible for managing the reliable transmission of these data packets through the network; one of the mechanisms by which TCP accomplishes this task is through the issuance of acknowledgements for received packets. Therefore, the two-phase access procedure would be performed for each TCP acknowledgement. Over the course of a transaction, such as accessing a web site, the two-phase access scheme imposes a heavy cost on the network performance.

Based on the foregoing, there is a clear need for improved approaches for establishing a communication channel for packet transfer in a radio communication system. There is also a need to reduce user response time. There is also a further need to enhance network throughput. Therefore, an approach for streamlining the packet channel access procedure using a more efficient protocol is highly desirable.

SUMMARY OF THE INVENTION

The present invention addresses the above stated needs by providing a capability to enhance system throughput of a packet radio communication system The present invention relates to the transmission of packets over a packet radio communication system. When a user terminal is in a synchronized state, the terminal utilizes a single-phase access procedure according to a medium access control (MAC) protocol and radio link control (RLC) protocol to obtain a packet data channel. The gateway station receives the packet channel request message and transmits an assignment message that specifies a channel assignment based upon the user terminal information. The present invention combines attributes of the packet channel request with the packet resource request messages. The user terminal has the capability to mix control and data packets. The system allocates unused uplink resources to the user terminals for appropriate use by the terminals, thereby saving valuable time and optimizing the use of radio resources to improve system responsiveness and throughput.

According to one aspect of the invention, a method is provided for establishing a packet communication channel in a radio communication system to exchange packets. The method includes receiving a packet channel request message that specifies user terminal information from a terminal over a contention channel according to a prescribed protocol. In addition, the method encompasses transmitting an assignment message that specifies a channel assignment based upon the user terminal information, wherein the packets are transmitted over a channel according to the channel assignment. Under this approach, response times are minimized.

According to another aspect of the invention, a radio communication system for exchanging packets comprises a terminal that is configured to transmit a packet channel request message that specifies user terminal information using a contention channel according to a prescribed protocol and a single access scheme. A gateway station is configured to receive the packet channel request message and to transmit an assignment message that specifies a channel assignment based upon the user terminal information to the terminal, wherein the terminal is configured to transmit the packets over a channel based on the channel assignment. The above arrangement advantageously provides enhanced system efficiency.

In another aspect of the invention, a computer-readable medium carrying one or more sequences of one or more instructions establishing a communication channel in a packet radio communication system to exchange packets is disclosed. The one or more sequences of one or more instructions include instructions which, when executed by one or more processors, cause the one or more processors to perform the step of receiving a packet channel request message that specifies user terminal information from a terminal over a contention channel according to a prescribed protocol. Another step includes transmitting an assignment message that specifies a channel assignment based upon the user terminal information. The packets are transmitted over a channel according to the channel assignment. This approach advantageously increases network throughput.

In yet another aspect of the invention, a satellite communication system for establishing a communication channel to exchange packets comprises means for receiving a packet channel request message that specifies user terminal information from a terminal over a contention channel according to a prescribed protocol. The system also includes means for transmitting an assignment message that specifies a channel assignment based upon the user terminal information. The packets are transmitted over a channel according to the channel assignment. Accordingly, the above approach advantageously reduces system delay.

In yet another aspect of the invention, a method for establishing a communication channel in a packet radio communication system to exchange packets is disclosed. The method includes determining whether a terminal is synchronized in time with the packet radio communication system. The method also includes selectively establishing a packet data channel using a single-phase access scheme based upon the determining step, and transmitting the packets by the terminal via the packet data channel over the packet radio communication system. This approach advantageously provides an efficient use of system resources.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is a message flow diagram of a conventional two-phase access scheme for uplink data transmission;

FIG. 5B is diagram of the format of a conventional 8 and 11 bit packet channel request message;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention optimizes protocol performance and user experience by minimizing response time associated with a radio communication system. A user terminal (UT) transmits a packet channel request message that specifies user terminal information using a contention channel according to a MAC/RLC protocol. A gateway station receives the packet channel request message and transmits an assignment message that specifies a channel assignment based upon the user terminal information. The terminal transmits the packets over a channel is based on the channel assignment. The radio communication system utilizes an unsolicited grant mechanism to streamline the exchange of control messages at the transport protocol level (e.g., TCP acknowledgements). Further efficiencies are gained by piggypacking control and data information as well as enabling the pipelining of multiple packet channel request messages and packet resource request messages.

Although the present invention is discussed with respect to the ETSI (European Telecommunications Standards Institute) GSM (Global Satellite Mobile Communications) protocol and the TCP/IP protocol stack, it is applicable to other equivalent protocols and signaling techniques in any packet based satellite communication system.

Figure 1:
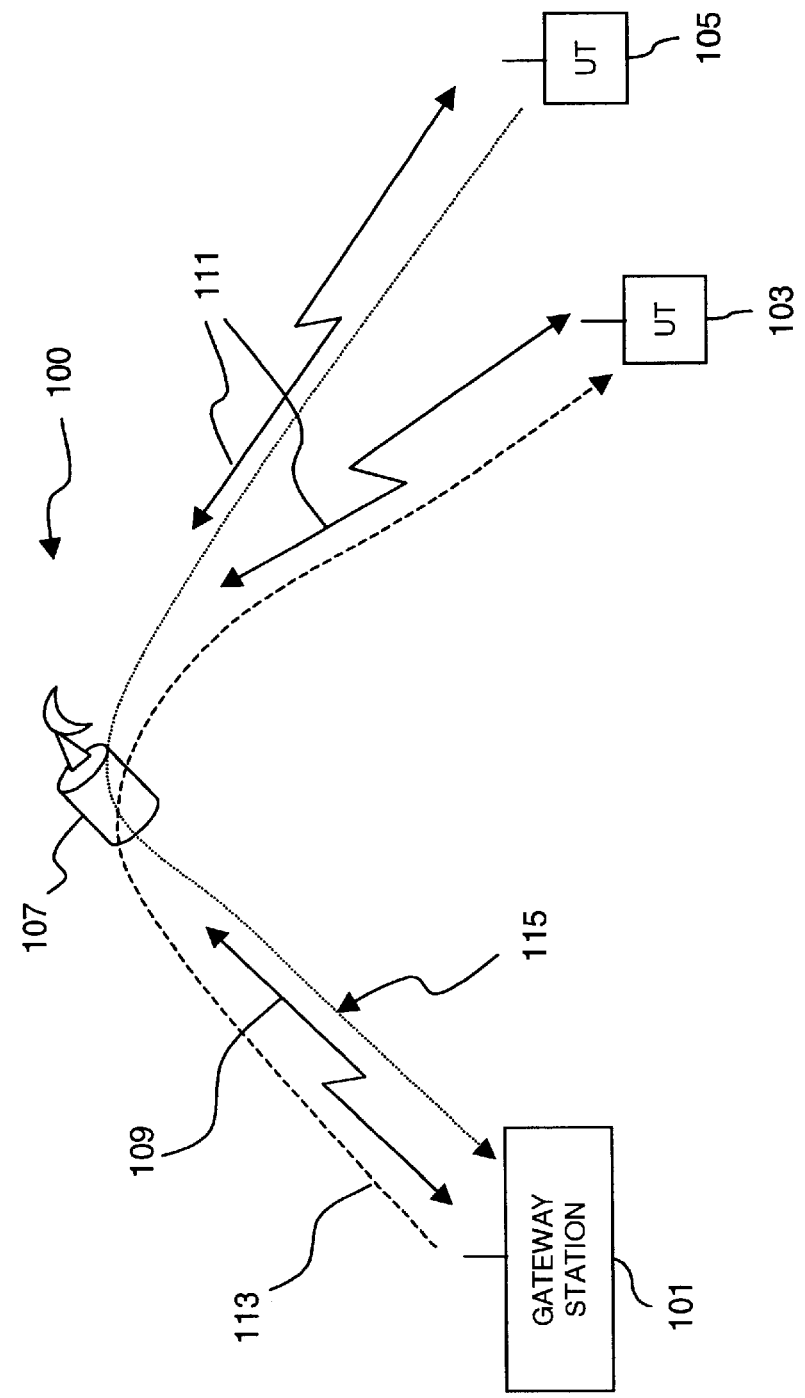
FIG. 1 is a diagram of a satellite communication system utilizing a Medium Access Control (MAC) and Radio Link Control (RLC) layer protocol, according to an embodiment of the present invention.

FIG. 1 is a diagram of a satellite communication system utilizing a Medium Access Control (MAC) and Radio Link Control (RLC) layer protocol, according to an embodiment of the present invention. A satellite communication system 100 includes a gateway station (GS) 101 that communicates with user terminals (UTs) 103 and 105 (through satellite 107. In an exemplary embodiment, feeder link 109 between the gateway station and the satellite is at C-band (4–8 GHz) and link 111 between the user terminal and the satellite is at L-band (1–2 GHz). For the purposes of explanation, a convention is adopted whereby the communication path 113 from gateway station 101 to the satellite 107 down to an UT, which in this example is UUT 103, is denoted as the downlink or forward link. Conversely, a communication path 115 from UT 105 up to the satellite 107 and down to the gateway station 101 is referred to as the uplink or return link.

Although not shown, the satellite communication system 100 may support connectivity to a packet data network (PDN) to permit the UTs 103 and 105 to communicate with various terrestrial systems via the gateway station 101.

The UTs 103 and 105 provide the subscriber interface to the system 100. The user terminal types may include hand held, vehicular, aeronautical, maritime and stationary units.

The gateway station 101 manages and allocates system communication resources that are necessary to support the communication traffic within their respective service areas, such as L-band spectrum and downlink EIRP (Effective Isotropically Radiated Power). For example, the gateway station 101 can provide allocation of communication resources within its service area (frequency and power), user authentication, and support of user roaming within the system coverage area.

Figure 2:
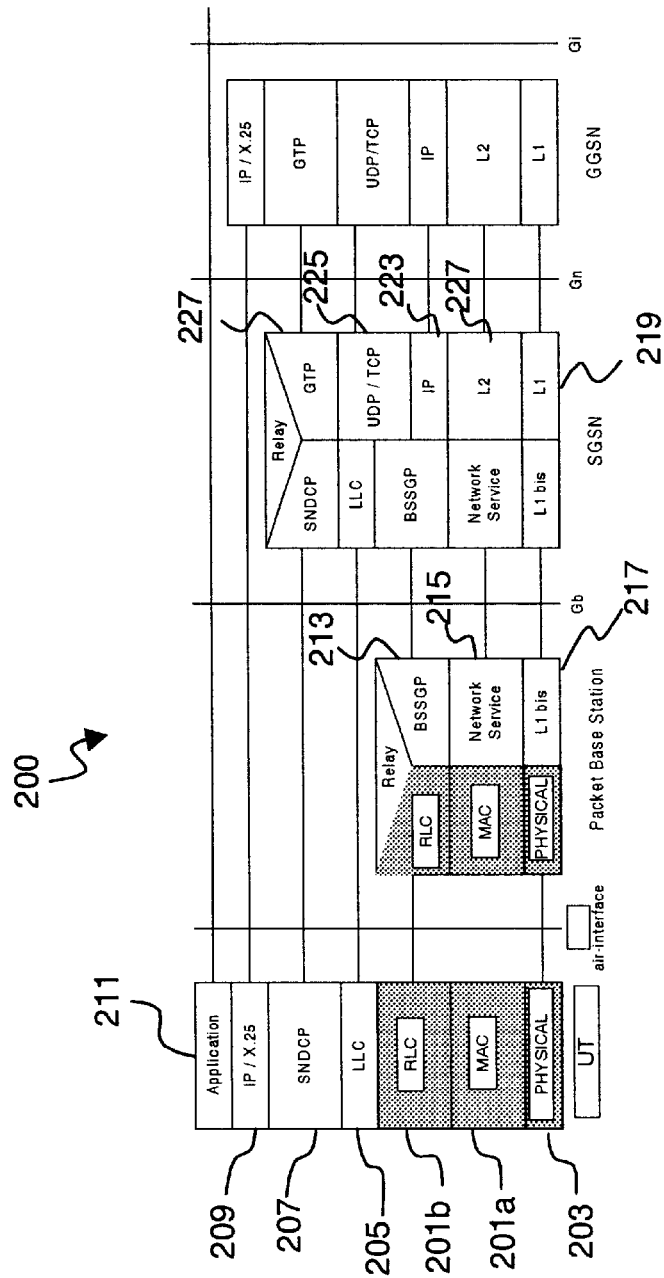
FIG. 2 is a block diagram of a transmission plane for packet switched services in the system of FIG. 1.

FIG. 2 is a block diagram of a transmission plane for packet switched services in the system of FIG. 1. A UT (e.g., 103) employs a protocol stack that includes a Medium Access Control (MAC) layer 201a and Radio Link Control (RLC) layer 201b that operate above the Physical Link layer 205 in the reference architecture 200. The protocol stack has a Logical Link Control (LLC) layer 205, above which is a Subnetwork Dependent Convergence Protocol (SNDCP) layer 207. The protocol stack also includes an IP layer 209 that is below application layer 211. The UT 103 communicates with a gateway station 101 via the RLC/MAC layer 201 and the physical layer 203. In turn, the gateway station 101 communicates with a serving GPRS support node (SGSN) using the following functions: BSSGP 213, network service 215, and L1 bis 217. BSSGP layer 213 conveys routing and QoS (quality of service) related information between gateway station 101 and SGSN. Network Service layer 215 transports BSSGP protocol data units between gateway station 101 and SGSN, using technologies such as frame relay, for example. L1-bis 217 is the physical link between gateway station 101 and SGSN and is specified, for instance, in the International Telecommunications Union (ITU)-T G.703 standard, which is incorporated herein by reference.

The SGSN that is on the side of the gateway station 101 includes the LLC layer 205 and the SNDCP layer 207. To communicate with a gateway GPRS support node (GGSN), the SGSN utilizes the following layers: L1 layer 219, L2 layer 227, an IP layer 223, a UDP (User Datagram Protocol)/TCP (Transmission Control Protocol) layer 225, and a GTP layer 227. As seen in the figure, GGSN employs an IP/X.25 layer 209 to support peer-to-peer communication with the UT 103.

As indicated by the shading, the MAC layer 201a and RLC layer 201b are modified from the conventional GSM standard to cater to longer delays associated with the satellite system 100 and to the different physical layer beneath these layers 201a and 201b.

As will become evident, the MAC/RLC services of system 100 provides a marked improvement over the conventional GSM GPRS standard. The MAC layer 201a defines the procedures that enable multiple UTs to share a common transmission medium, which may consist of several channels multiplexed over the same physical resource. The MAC layer 201a provides arbitration between multiple UTs that are attempting to transmit simultaneously and provides collision avoidance, detection and recovery procedures. The operations of the MAC layer 201a may allow a single UT to use several physical channels in parallel.

According to one embodiment of the present invention, the MAC layer 201a is responsible for providing efficient multiplexing of data and control signaling on both uplink and downlink, in which the control resides on the Network side. On the downlink, multiplexing is controlled by a scheduling mechanism. On the uplink, multiplexing is controlled by medium allocation to individual users (e.g., in response to packet channel request). The MAC layer 201a also provides contention resolution between packet channel request attempts, including collision detection and recovery, for UT originated channel access. Priority handling is also handled by the MAC layer 201a.

As for the RLC layer 201b, a number of functions are provided. Specifically, the RLC layer 201b supports interface primitives that allows the transfer of Logical Link Control layer PDUs (LLC-PDU) between the LLC layer 205 and the MAC layer 201a. The RLC layer is responsible for segmentation of LLC-PDUs into RLC Data Blocks and re-assembly of RLC Data Blocks to LLC-PDU. Additionally, the RLC/MAC layer 201 function provides two modes of operation: unacknowledged operation, and acknowledged operation. In acknowledged mode of operation, the RLC/MAC supplies ARQ (automatic repeat request) procedures to enable the selective retransmission of missing or unrecoverable code blocks. It should be noted that to assist ARQ type of error recovery, the Block Check Sequence for error detection is provided by the Physical Link Layer 203.

Figure 3:
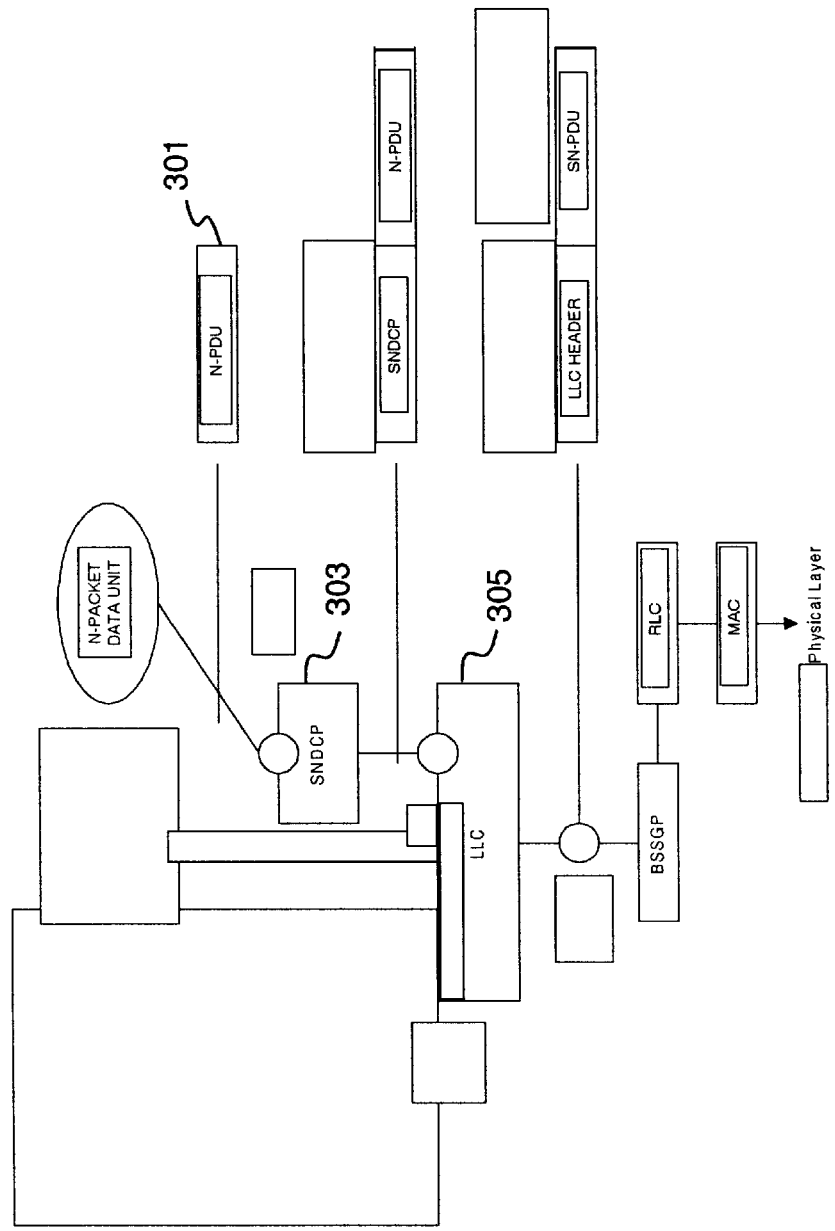
FIG. 3 is a diagram of the segmentation of IP (Internet Protocol) Packets at the network layer that is above the MAC/RLC layer, according to an embodiment of the present invention.

FIG. 3 is a diagram of the mapping of network-packet data units, which may be IP. Packets at the network layer that is above the MAC/RLC layer, according to an embodiment of the present invention. The physical channel defined for GPRS is the Packet Data Channel (PDCH). Packet traffic and control channels are carried on the same physical channel. The packet data traffic channel (PDTCH), the packet associated control channel (PACCH) and packet common control channel (PCCCH) channels are multiplexed on the PDCH. Each Packet Data Channel PDCH is a shared medium between multiple UTs and the network.

The radio interface, according to an embodiment of the present invention, includes asymmetric and independent uplink and downlink PDCH. The downlink carries transmissions from the network to multiple UTs and does not require contention arbitration. The uplink is shared among multiple UTs and requires contention control procedures.

The allocated uplink and downlink radio resources may be used independently of each other. Depending on the terminal capabilities, the number of data blocks in the queue, and the resource availability, a UT may be assigned to one or a multiple of PDCHs.

The system 100 may allocate radio resources for the uplink and downlink in a symmetric manner if so requested by the UT in Packet channel Request Message. The access to the uplink uses a Slotted-Aloha based reservation protocol.

The Network Protocol Data Units (N-PDU) 301, such as IP packets, are segmented into the Subnetwork Protocol Data Units (SN-PDU) by the Subnetwork Dependent Convergence (SNDC) protocol 303 and SN-PDUs are encapsulated into LLC frames. The LLC 305 and SNDC 303 functionality are similar to that used in GSM GPRS as defined in GSM 04.64 and GSM 04.65, respectively; which are incorporated herein by reference in their entirety.

Figure 4:
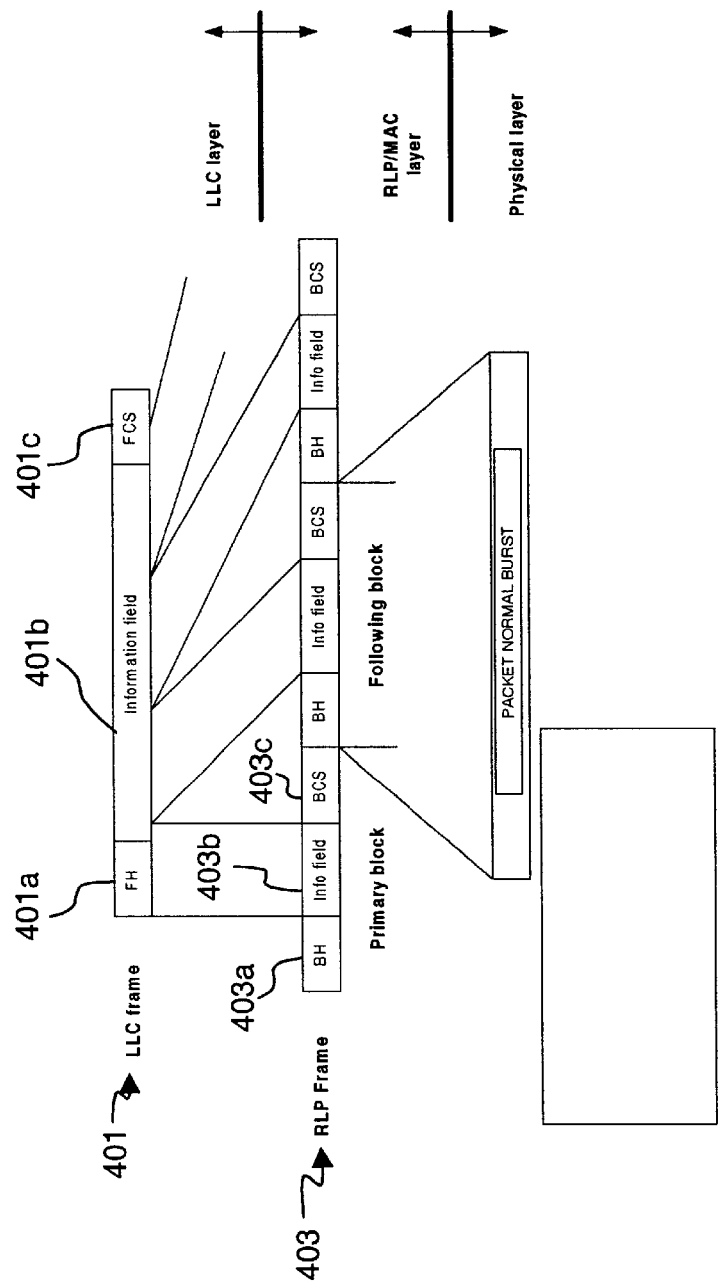
FIG. 4 is a diagram of segmentation at the user terminal (UT) for uplink transmission, according to an embodiment of the present invention.

FIG. 4 is a diagram of segmentation at the user terminal for uplink transmission, according to an embodiment of the present invention. LLC frames 401 are segmented into RLC Data Blocks 403. The LLC frame 401 includes a frame header 401a, an information field 401b, and a frame check sequence (FCS) 401c. Each RLC block 403 contains the following three fields: block header (BH) 403a, an information field 403b, and a block check sequence (BCS) 403c. At the RLC layer 201b, a selective ARQ protocol (including block numbering) between the UT and the network provides retransmission of erroneous RLC data blocks. When a complete LLC frame 401 is successfully transferred across the RLC layer 201b, it is forwarded to the L1c layer 205a. Further, 100 permits transport of multiple LLC frames 401 in one RLC block.

Within the BH 403a of the RLC frame 403, an uplink state flag (USF) is used to allow multiplexing of radio blocks from a number of UTs. USF is used in dynamic and extended dynamic medium access modes, as defined in GSM GPRS. In addition, a reserved USF pattern is used to permit users to determine the availability of a given uplink packet data channel for transmitting a packet channel request message. This is particularly necessary when packet common control channels PCCCH share a packet data channel with packet traffic data channel PDTCH (Packet Data Traffic Channel).

A Temporary Block Flow (TBF) is a physical connection used by the two RR entities to support the unidirectional transfer of LLC PDUs on packet data physical channels. The TBF is allocated radio resource on one or more PDTCHs and comprise a number of RLC/MAC blocks carrying one or more LLC PDUs. As the name implies, TBF is temporary and is maintained only for the duration of the data transfer.

Each TBF is assigned a Temporary Flow Identity (TFI) by the network. The assigned TFI is unique among concurrent TBFs in each direction and is used instead of the UT identity in the RLC/MAC layer. The same TFI value may be used concurrently for TBFs in opposite directions. The TFI is assigned in PACKET UPLINK ASSIGNMENT and PACKET DOWNLINK ASSIGNMENT messages that precede the transfer of LLC frames 401 belonging to one TBF to/from the UT. The same TFI is included in every RLC header belonging to a particular TBF as well as in the control messages associated to the LLC frame 401 transfer (e.g., acknowledgements) in order to uniquely address the peer RLC entities.

GSM GPRS permits the establishment of only a single TBF for the uplink and a single TBF for the downlink of a UT at any time. According to an embodiment of the present invention, the network may assign multiple uplink TBF's and multiple downlink TBF's with different properties, such as reliability priority or precedence simultaneously.

The system 100 support a fixed mode of medium access. Upon a channel request from a UT (e.g., 103 and 105), the network determines (after taking into account the propagation delay) the time-slot, frequency and the frame numbers on which the requesting terminal is expected to transmit and this information is transmitted to the UT in Packet Uplink Assignment message.

FIG. 5A is a message flow diagram of a two-phase access scheme for uplink data transmission, as is used with the conventional GSM GPRS protocol. A UT initiates a packet transfer by making a Packet Channel Request on a random access channel (RACH), step 501. Specifically, a UT first transmits an 8 or 11-bit Channel request message on RACH or PRACH (as shown in FIG. 5B, if PRACH is available) channel to the network, simply indicating its intention to perform a packet transfer; no details about, for example, UT identification, capabilities of the terminal, and mode of operation, can be provided in the 8 bit message or the 11 bit message. In response to the Packet Channel Request for a two-phase access, the gateway station 101 transmits, as in step 503, a Packet Uplink Assignment message on AGCH or PAGCH, which allocates a single block of uplink resources. The Packet Resource Request message, as transmitted, on the single assigned block of uplink resources in a PACCH, by the UT in step 505, carries the complete description of the requested resources for the uplink transfer, for example, TLLI, RLC and LLC mode of operation, number of bytes required to transfer, radio priority, peak throughput class, and etc. The UT can indicate the medium access method that the UT prefers to be used during the TBF. The network responds with another Packet Uplink Assignment to reserve resources for the uplink transfer of data (step 507), taking into account the UT's capabilities, radio priority, resource availability etc. The UT then transmits uplink data over the PDTCH, per step 509. Clearly, for systems with long delay, this is inefficient and results in slow responsiveness. As a result, TCP at the transport layer remains in slow-start phase for an even longer duration.

Under the conventional GSM GPRS approach, the protocol predominantly uses a two-phase access procedure for uplink data transmission, as described above. In contrast, the approach according to an embodiment of the present invention employs a predominately single-phase access procedure, as discussed below.

If there is no response to the Packet Channel Request within predefined time period, the UT makes a retry after a random backoff time. The optimal persistence of the UTs is calculated at the network side. The actual persistence values depend on the following factors: priority of the packet to be transmitted, amount of traffic within higher priority classes, and the amount of traffic within the own priority class.

On RACH, a backoff algorithm can be used. Occasionally, more Packet Channel Requests can be received than can be served. To address this issue, a Packet Queuing Notification, for example, is transmitted to the sender of the Packet Channel Request. The notification includes information that the Packet Channel Request message is correctly received and Packet Uplink Assignment may be transmitted later. The Packet Queueing Notification causes the sender to cease transmission of channel requests, thus preventing overloading of the contention access channels.

Fixed allocation uses the Packet Uplink Assignment message to communicate a detailed fixed uplink resource allocation to the UT. The fixed allocation has a start frame, slot assignment, and the assigned blocks (actually number of TDMA frames) per timeslot. The UT waits for the start frame and then transmits radio blocks on those blocks indicated in the block assignment bitmap. The fixed allocation does not include the USF and the UT is free to transmit on the uplink without monitoring the downlink for the USF. If the current allocation is not sufficient, the UT may request additional resources in one of the assigned uplink blocks by pre-empting the transmission of one of its own data blocks. A unique TFI is allocated and is thereafter included in each RLC data and control block related to that Temporary Block Flow. Because each Radio Block includes an identifier (TFI), all received Radio blocks are correctly associated with a particular LLC frame 401 and a particular UT.

The number of blocks a UT requests in the initial and subsequent allocation request messages account for the number of data and control blocks the UT intends to send. The UT does not request additional blocks for the retransmission of erroneous blocks. The network can repeat the allocation of radio resources by setting the parameter in the Packet Uplink Assignment or the Packet Uplink Ack/Nack (Acknowledgement/Negative acknowledgement) message.

Contention resolution is an important part of RLC/MAC protocol operation, especially because one channel allocation can be used to transfer a number of LLC frames 401. Contention resolution applies for both dynamic and fixed allocation medium access modes.

The two-phase access is inherently immune for the possibility that two UTs can perceive the same channel allocation as their own. Namely, the second access phase, the Packet Resource Request, uniquely identifies the UT by its Temporary Logical Link Identifier (TLLI). The TLLI identifies the user in the system (between UT and SGSN). The TLLI is derived from P-TMSI allocated by SGSN or manufactured at the UT using methods which are detailed in Section 14.3 of GSM 03.60, which is incorporated herein by reference. The same TLLI is included in the Packet Uplink Assignment/Packet Downlink Assignment, and thus, the probability of mistake is significantly reduced.

Identification of the UT poses a challenge in the one-phase access scheme. The identification of transmitting UT on the RLC/MAC level is necessary not only for contention resolution but also to be able to establish RLC protocol entity for that Temporary Block Flow on the network side. Additionally, the TLLI is necessary to be able to match simultaneous uplink and downlink packet transfers by taking into consideration multislot capability of that UT. In an aspect of the present invention, the packet channel request message transmitted on the PRACH has been designed so that the TLLI is included in this message. This saves the requirement of doing a post-TBF establishment contention resolution procedure.

Another consideration is the notification from the network side about which user owns the allocation. The inclusion of the TLLI in the Packet Uplink Ack/Nack/Packet Downlink Ack/Nack addresses this concern. This message is sent at an early stage, even before the receive window for RLC/MAC protocol operation is full. By doing so, the contention is resolved after the first occurrence of Packet Ack/Nack. The possibility of RLC Data Blocks being captured from "wrong" UT, thus destroying the LLC frame 401, is thus prevented by retransmissions on the LLC layer 205.

In one embodiment of the present invention, when the satellite is in geostationary earth orbit, the single-phase access may always be employed. For example, if the packet switched protocol described by the present invention were applied to the ETSI Geo-Mobile Radio-1 (GMR-1) air interface protocol, then single-phase access could always be achieved. However, when the satellite is in low earth orbit or mid-earth orbit and as a consequence is moving rapidly relative to the surface of the earth, the synchronization of the terminal may be an issue.

In another embodiment of the present invention, the two-phased access scheme may be employed if the user terminal (UT) (e.g.,UT 103) is not synchronized with the gateway station 101 (i.e., unsynchronized state). Because satellite 107 and the UT 103 are continually moving in such a system, message synchronization is needed to properly exchange data. Upon establishing synchronization by using the two-phase access scheme, subsequent communication sessions can be established using a one-phase access scheme; such an access scheme can be employed so long as the UT 103 does not "fall out" of synchronization. That is, if communication is not maintained between the UT 103 and the gateway station 101 beyond a certain time period, the UT 103 and the gateway station 101 will lose synchronization. Within this time period, the UT 103 and the gateway station 101 is in a synchronized state. This time period depends on a number of factors, including propagation delay, and system latency.

FIG. 5B shows the conventional format of the 8 bit and 11 bit packet channel request message for two-phase access. In the 8 bit packet channel request message 521, a five bit indicator 01000 indicates two-phase access request. The 8 bit packet channel request message 521 also includes a 3 bit Random Reference field 521*b*. Similarly, an 11 bit packet channel request message 523 includes a six bit indicator 110000 to indicate two-phase access request. Unlike the 8-bit message, the 11 bit packet channel request message 523 utilizes a 2 bit Priority field 523*b* to specify the priority associated with the packet channel request message 523. Also, the 11 bit packet channel request message 523 employs Random Reference field 523*c* that has a length of 3 bits as in the case of the 8 bit message.

Figure 6A:
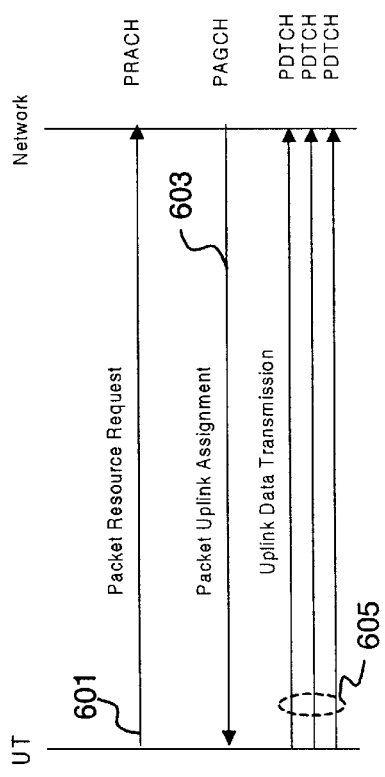
FIG. 6A is a message flow diagram of a single-phase access scheme for uplink data transmission, according to an embodiment of the present invention.
Figure 6B:
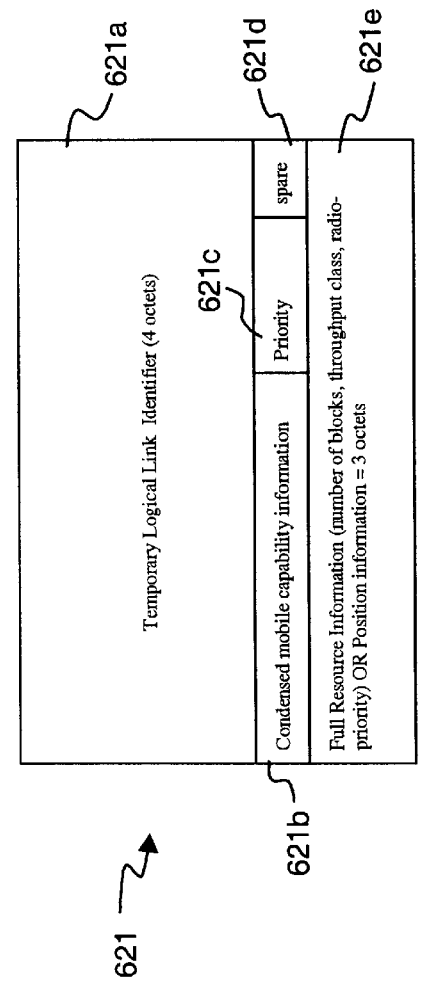
FIG. 6B is a diagram of the format of a 64-bit packet channel request message that combines elements of the packet resource request message, according to an embodiment of the present invention.

FIG. 6A is a message flow diagram of a single-phase access scheme for uplink data transmission, according to an embodiment of the present invention. According to an embodiment of the present invention, a physical channel for PRACH burst structure for the system 100 is defined so as to support a 64-bit packet channel request message, as shown in FIG. 6B, (in GSM RACH and PRACH physical channels carry the same 8 or 11 bit Packet Channel Request message and have the same burst structure) that permits single-phase access to be used predominantly, and hence, improve the responsiveness of the system. The PRACH burst structure carries a 64-bit Packet channel Request message with all the details about UT capabilities, TLLI, Radio Priority, RLC and LLC modes, etc. Further, PRACH bursts are such that there is a longer guard time than regular PDCH bursts to accommodate timing uncertainties. Accordingly, the burst for the PRACH within a TDMA time slot is smaller than the PDCH burst.

In the one-phase access protocol according to an embodiment of the present invention, the UT 103 immediately transmits a 64-bit packet channel request message, per step 601. In step 603, the Packet Channel Request is answered by the network with the Packet Uplink Assignment, reserving the resources on PDTCH(s) for uplink transfer of a number of Radio blocks. The reservation is done according to the information about the requested resources that is comprised in the Packet Channel Request. This Packet Channel Request contains more adequate information about the requested resources including details of the QoS guarantees required for the transfer and, consequently, uplink resources on one or several PDTCHs can be assigned by using the Packet Uplink Assignment message. Next, the UT 103 sends data, as in step 605, over the PDTCHs that were assigned.

Figure 7A:
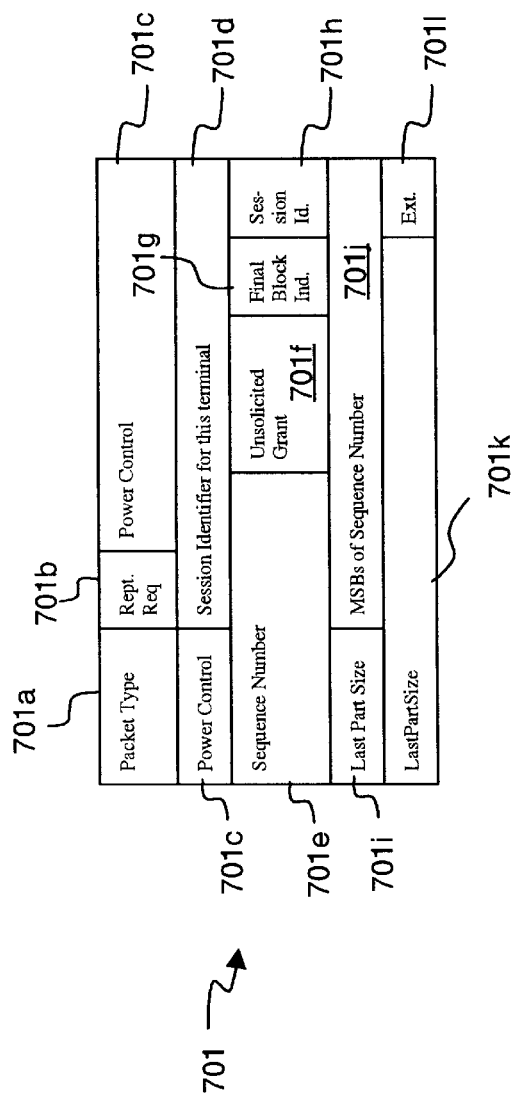
FIGS. 7A and 7B are diagrams of the forward and reverse MAC/RLC header formats, respectively, that support the piggybacking operation, in accordance with an embodiment of the present invention.

FIG. 7A shows the process of transmitting data over the uplink of the system of FIG. 1. It is noted that single-phase access scheme does exist in the conventional GSM GPRS on RACH or PRACH, but has several drawbacks. Given that the 8 or 11 bit packet Channel Request message does not contain UT capabilities, only a single PDCH can be allocated even though the terminal may be capable of transmitting in multiple slots. Therefore subsequent data transmissions will be at a very low throughput. Further, since the packet Channel Request message for one-phase access only has a 2 bit random reference, contention resolution is much longer and perhaps even longer than the time taken for a two-phase access. Therefore the PRACH design of the present invention accommodates the UT capabilities, TLLI, RLC and LLC modes, radio priority etc, so as to improve throughput and responsiveness of the system.

Figure 7B:
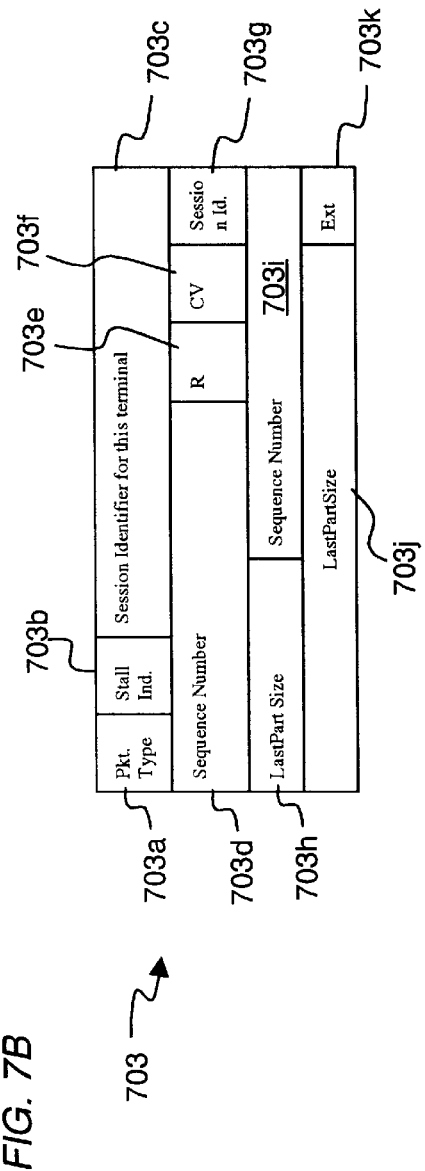

FIGS. 7A and 7B show diagrams of the forward and reverse MAC/RLC header formats, respectively, that support the piggybacking operation, in accordance with an embodiment of the present invention. A MAC/RLC header 701 for the forward direction includes the following fields: a Packet Type field 701a, a Rept. Request field 701b, a Power Control field 701c, a Session Identifier field 701d, a Sequence Number field 701e, an Unsolicited Grant field 701f, a Final Block Indicator field 701g, a Session Identifier field 701h, a Last Part Size field 701i, a Partial Sequence Number field 701j, a Last Part Size field 701k, and an Extended field 701l. Extended field 701l indicates whether the length of the Last Part Size field 701l is increased by the length of field 701k. The 701a field indicates whether the RLC block contains a data-only or control-only or control+data in its payload. Field 701b is a method to solicit a report or a response (such as RLC acknowledgement) from the UT 103. Field 701c indicates the power control bits that are used to dictate the power level to be used for UT transmission. Field 701d in conjunction with field 701h is the equivalent of a Temporary Flow Identifier (TFI) of GSM GPRS; this identifies the terminal at the RLC layer when the UT 103 is in packet transfer mode. Field 701e in conjunction with field 701j is the sequence number used in most ARQ based retransmission protocols. Field 701f indicates the number of unsolicited uplink blocks granted to the UT 103. Field 701g indicates the UT 103 that the gateway station 101 has finished transmitted all LLC PDUs and none are outstanding; in RLC acknowledged mode this will trigger an RLC acknowledgement in UT 103. Field 701i together with field 701k indicates the beginning point of a new LLC frame within the RLC block.

In the reverse direction, MAC/RLC header 703 has the following fields: a Packet Type field 703a, a Stall Indication field 703b, a Terminal Session Identifier field 703c, a Sequence Number field 703d, an R field 703e, a CV field 703f, a Session Identifier field 703g, a LastPart Size field 703h, a Sequence Number field 703i, a Last Part Size field 703j, and an Extended field 703k. Field 703a indicates the packet type such as data and control. Field 703b indicates whether the RLC layer in the UT 103 has stalled because of not receiving acknowledgement from the network. Field 703c in conjunction with field 703g is equivalent to Temporary Flow Identifier (TFI) of GSM GPRS. Field 703d in conjunction with 703i denotes the sequence number. Field 703e is the Retry bit that indicates whether the RLC control block is a repetition of the previous attempt. Field 703f indicates the Countdown Value (CV) which indicates to the network whether this is the last RLC block or more is pending. Field 703h in conjunction with field 703j carry the same information as that carried by field 701i in conjunction with field 701k. Field 703k denotes the extension bit to permit future expansions of the MAC header.

Figure 8:
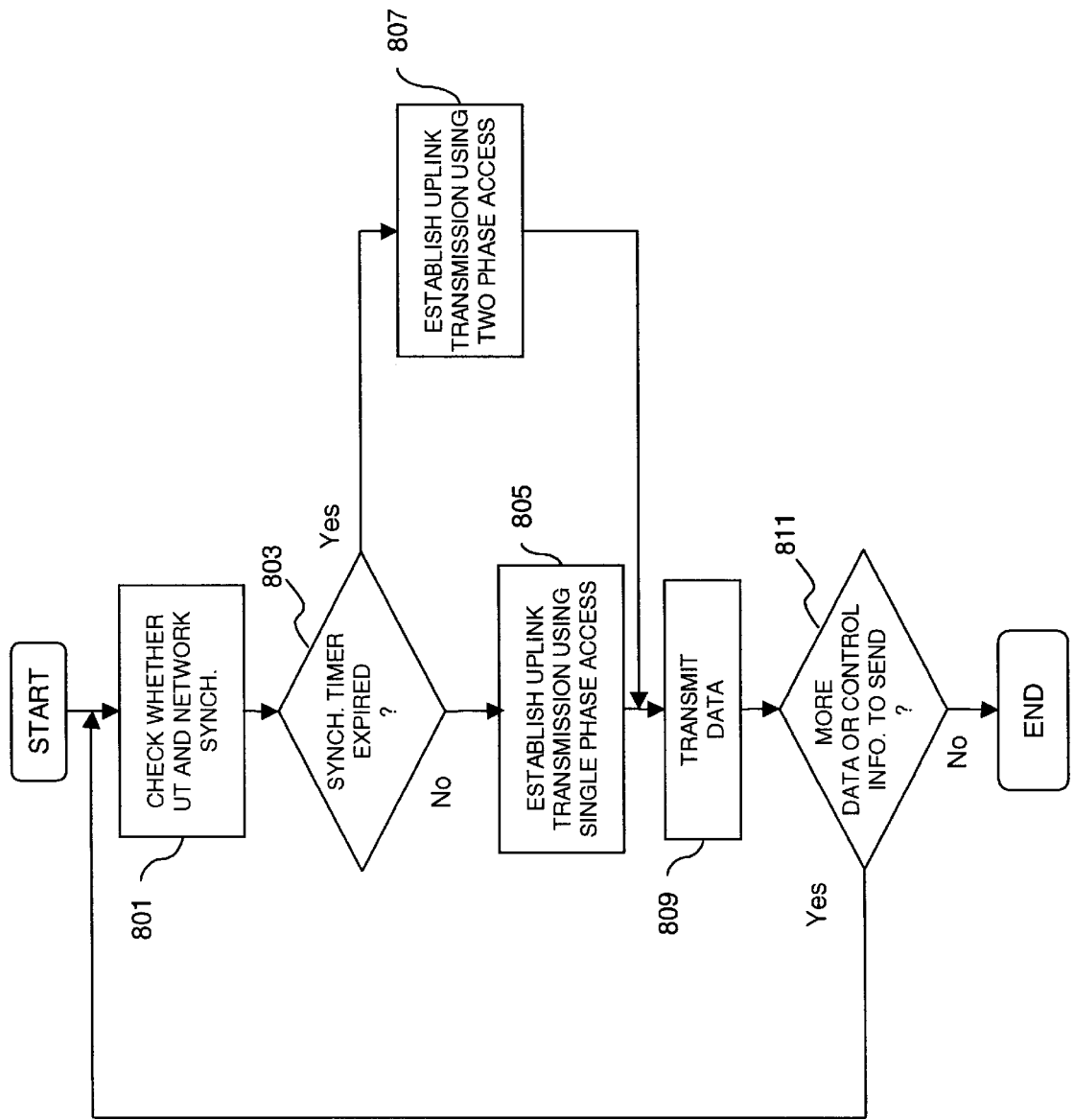
FIG. 8 is a flow chart of the process of employing the single-phase access scheme in conjunction with the two-phase access scheme, according to an embodiment of the present invention.

FIG. 8 shows a flowchart of the single-phase access scheme, according to an embodiment of the present invention. A single-phase access scheme is used whenever the terminal (e.g., UT 103) is in partial or coarse sync with the network 100, such that the transmitted burst from the terminal falls within the timing acquisition window of the demodulator of a PRACH channel. When the UT 103 is not in sync with the network, a two-phase access scheme is used initially; that is, until synchronization is established. In step 801, gateway station 101 determines whether the UT 103 is synchronized with the network 100. A synchronization timer is used to make this determination. If the synchronization timer is expired, a packet data channel (e.g., an uplink transmission channel) is established using a two-phase access scheme, per step 807. However, if the synchronization timer has not expired, indicating that the UT 103 is synchronized with the network 100, then the one phase access scheme is utilized (per step 805). Next, the UT 103 transmits the data, as in step 809. If there are more data to transmit, as determined by step 811, then steps 801–809 are repeated as appropriate. However, the process ends if the UT 103 has no more data to send.

Figure 9:
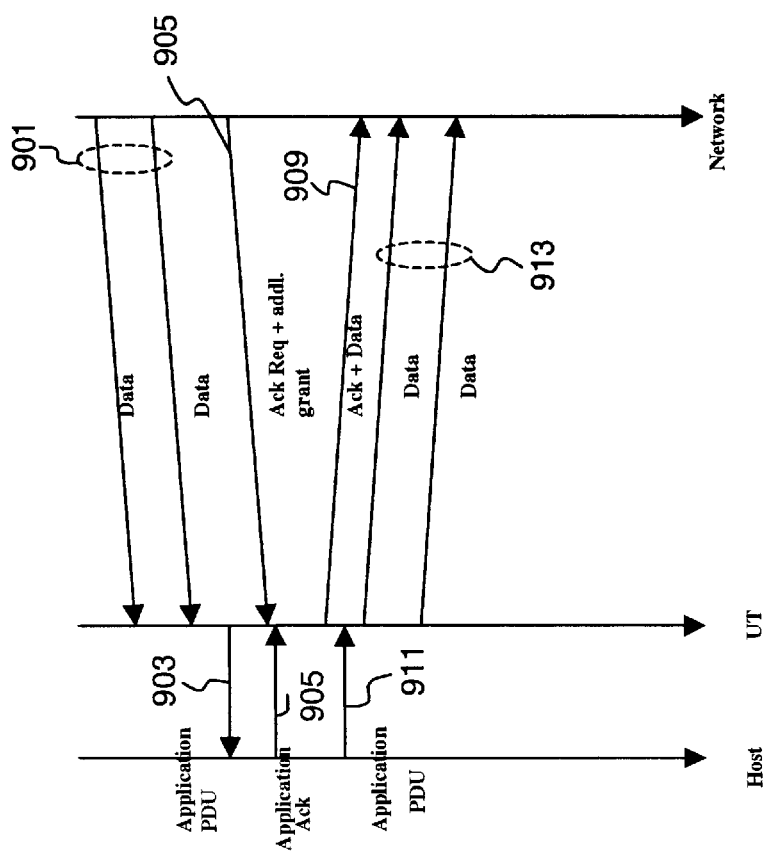
FIG. 9 is a message flow diagram of the piggybacking operation and unsolicited grant mechanism, in accordance with an embodiment of the present invention.

FIG. 9 is a message flow diagram, illustrating the piggybacking operation and unsolicited grant mechanism, in accordance with an embodiment of the present invention. In conventional GSM GPRS standard, during downlink data transmission, RLC acknowledgements from user terminal 103 are explicitly solicited by the network 100, which is detailed in the GSM 04.60 standard (Section 9) and incorporated herein by reference. Transmission of an RLC acknowledgement is requested by the network 100 when it has completed transmission of LLC frames 401 and/or when the RLC window size has expired. At this juncture, the network 100 allocates only sufficient uplink resources to the user terminal 103 for transmitting an RLC acknowledgement. However, if the user terminal 103 subsequently has to send an upper layer acknowledgement, such as at LLC layer and more importantly at TCP layer, then the UT 103 has to undergo the uplink access procedure described in FIG. 7A.

To promote efficient exchange of acknowledgement messages, system 100 employs an unsolicited uplink grant mechanism, which allocates additional uplink resources to the user terminal 103, so as to permit the upper layer acknowledgements to be transported without undergoing an uplink access procedure. That is, the access procedures of FIGS. 5A and 6A are bypassed. The system 100 estimates the requirement of the terminal 103 based on its usage pattern. This mechanism of unsolicited uplink grants significantly improves the throughput of the system 100 and permits the TCP layers to transition out of the slow-start phase quickly. As seen in FIG. 9, the gateway station 101 communicates with the UT 103, which in turn, exchanges information with a host computer, for example.

In step 901, the network 100 transmits data to the UT 103. Upon receiving the data, the UT 103 forwards the information to the host in form of an application protocol data unit (PDU), per step 903. Recognizing that an upper layer acknowledgement (e.g., TCP ack) is going to be transmitted in response to the transferred data and acknowledgement request from the network 100, the network 100 allocates resources for the acknowledgement (step 905). The application on the host, as in step 907, issues an acknowledgement. Because the network 100 has already dedicated resources for the acknowledgement, the UT 103 need not obtain uplink resources, using the access procedures of FIGS. 5A and 6A. Accordingly, the UT 103 transmits the acknowledgement, as in step 907.

To further improve the responsiveness of the system, the packet data system 100 allows piggybacking control and data frames. In step 909, the UT 103 transmits an acknowledgement, along with data that has been received by the host, to the network 100. By contrast, the conventional GSM GPRS does not allow piggybacking of data and control frames. The MAC headers are defined to accommodate this mixture data-control RLC block as shown in FIGS. 7A and 7B. In step 911, the host transmits data to the UT 103, which then transfers the data to the network 100 (step 913). As seen from the above example, the data transfer is optimized by using a combination of unsolicited grants for acknowledgement and piggybacking the acknowledgement with data.

In the conventional GSM GPRS, only one uplink packet resource request message or packet channel request message may be outstanding at a given point of time. The system 100 of FIG. 1 permits a pipeline of cumulative packet channel requests or packet resource requests so that the network 100 may simply respond to the latest request and ignore other requests if they have not yet been honored. This approach also mitigates the effects of lost requests. The UT 103 assists the network 100 in making response allocation decisions by explicitly indicating in the uplink MAC header whether a particular uplink packet resource request was a cumulative or a stand-alone packet resource request. Absence of this feature (namely, responding to requests as though each request was a stand-alone request) would have significantly increased the delay in resource allocation, and increase the number of messages to be handled for the same number of uplink resources.

Figure 10:
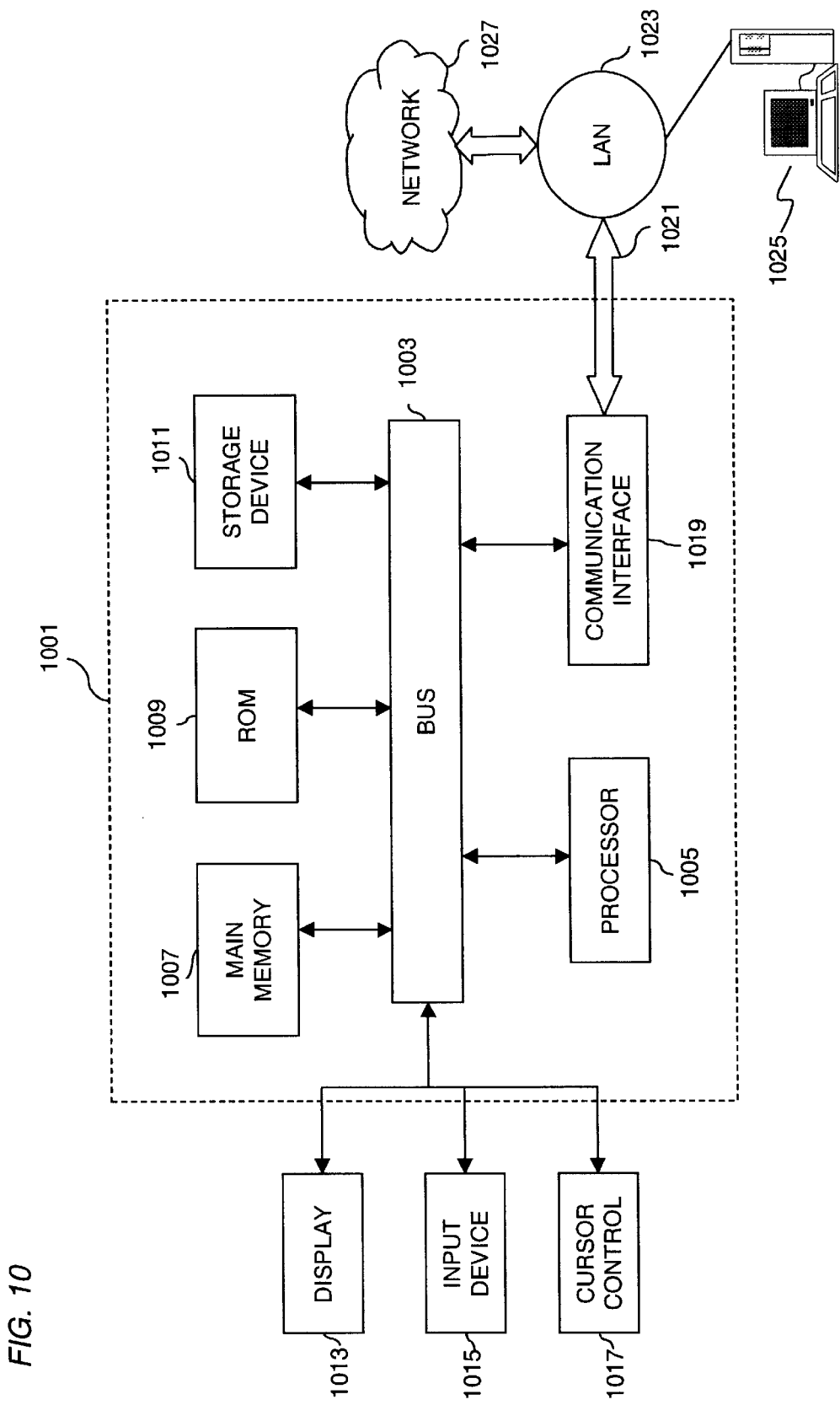
FIG. 10 is a diagram of a computer system that can execute the MAC/RLC layer protocol, in accordance with an embodiment of the present invention.

FIG. 10 illustrates a computer system 1001 upon which an embodiment according to the present invention may be implemented execute the MAC/RLC layer protocol. Computer system 1001 includes a bus 1003 or other communication mechanism for communicating information, and a processor 1005 coupled with bus 1003 for processing the information. Computer system 1001 also includes a main memory 1007, such as a random access memory (RAM) or other dynamic storage device, coupled to bus 1003 for storing information and instructions to be executed by processor 1005. In addition, main memory 1007 may be used for storing temporary variables or other intermediate information during execution of instructions to be executed by processor 1005. Computer system 1001 further includes a read only memory (ROM) 1009 or other static storage device coupled to bus 1003 for storing static information and instructions for processor 1005. A storage device 1011, such as a magnetic disk or optical disk, is provided and coupled to bus 1003 for storing information and instructions.

Computer system 1001 may be coupled via bus 1003 to a display 1013, such as a cathode ray tube (CRT), for displaying information to a computer user. An input device 1015, including alphanumeric and other keys, is coupled to bus 1003 for communicating information and command selections to processor 1005. Another type of user input device is cursor control 1017, such as a mouse, a trackball, or cursor direction keys for communicating direction information and command selections to processor 1005 and for controlling cursor movement on display 1013.

According to one embodiment, the single-phase access procedure is provided by computer system 1001 in response to processor 1005 executing one or more sequences of one or more instructions contained in main memory 1007. Such instructions may be read into main memory 1007 from another computer-readable medium, such as storage device 1011. Execution of the sequences of instructions contained in main memory 1007 causes processor 1005 to perform the process steps described herein. One or more processors in a multi-processing arrangement may also be employed to execute the sequences of instructions contained in main memory 1007. In alternative embodiments, hard-wired circuitry may be used in place of or in combination with software instructions. Thus, embodiments are not limited to any specific combination of hardware circuitry and software.

Further, the single access procedure may reside on a computer-readable medium. The term "computer-readable medium" as used herein refers to any medium that participates in providing instructions to processor 1005 for execution. Such a medium may take many forms, including but not limited to, non-volatile media, volatile media, and transmission media. Non-volatile media includes, for example, optical or magnetic disks, such as storage device 1011. Volatile media includes dynamic memory, such as main memory 1007. Transmission media includes coaxial cables, copper wire and fiber optics, including the wires that comprise bus 1003. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1005 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 1001 can receive the data on the telephone line and use an infrared transmitter to convert the data to an infrared signal. An infrared detector coupled to bus 1003 can receive the data carried in the infrared signal and place the data on bus 1003. Bus 1003 carries the data to main memory 1007, from which processor 1005 retrieves and executes the instructions. The instructions received by main memory 1007 may optionally be stored on storage device 1011 either before or after execution by processor 1005.

Computer system 1001 also includes a communication interface 1019 coupled to bus 1003. Communication interface 1019 provides a two-way data communication coupling to a network link 1021 that is connected to a local network 1023. For example, communication interface 1019 may be a network interface card to attach to any packet switched local area network (LAN). As another example, communication interface 1019 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1019 sends and receives electrical, electromagnetic or optical signals that carry digital data streams representing various types of information.

Network link 1021 typically provides data communication through one or more networks to other data devices. For example, network link 1021 may provide a connection through local network 1023 to a host computer 1025 or to data equipment operated by a service provider, which provides data communication services through a communication network 1027 (e.g., the Internet). LAN 1023 and network 1027 both use electrical, electromagnetic or optical signals that carry digital data streams. The signals through the various networks and the signals on network link 1021 and through communication interface 1019, which carry the digital data to and from computer system 1001, are exemplary forms of carrier waves transporting the information. Computer system 1001 can transmit notifications and receive data, including program code, through the network (s), network link 1021 and communication interface 1019.

The techniques described herein provide several advantages over prior approaches to providing increased system throughput and efficiency of a satellite communication system, thereby minimizing response time. When a user terminal is in a synchronized state, the terminal utilizes a single-phase access procedure according to a medium access control (MAC) protocol and radio link control (RLC) protocol to obtain a packet data channel. The gateway station receives the packet channel request message and transmits an assignment message that specifies a channel assignment based upon the user terminal information. To further enhance system performance, the system utilizes an unsolicited grant mechanism to streamline the exchange of control messages (e.g., TCP acknowledgements). Further efficiencies are gained by piggypacking control and data information and pipelining the packet resource request messages.

Obviously, numerous modifications and variations of the present invention are possible in light of the above teachings. It is therefore to be understood that within the scope of the appended claims, the invention may be practiced otherwise than as specifically described herein.

What is claimed is:

1. A method for establishing a communication channel in a packet radio communication system to exchange packets, the method comprising:

receiving a packet channel request message that specifies user terminal information from a terminal over a contention channel according to a prescribed protocol;

transmitting an assignment message that specifies a channel assignment based upon the user terminal information, wherein the packets are transmitted over a channel according to the channel assignment;

transmitting an unsolicited grant message that pre-allocates uplink resources of the packet radio communication system to the terminal; and receiving a control message based upon the step of transmitting the unsolicited grant message.

2. The method according to claim 1, wherein the control message in the step of receiving the control message includes an upper layer protocol acknowledgement.

3. A radio communication system for exchanging packets, the system comprising:

a terminal configured to transmit a packet resource request message that specifies user terminal information using a contention channel according to a prescribed protocol and a single access scheme; and a gateway station configured to receive the packet resource request message and to transmit an assignment message that specifies a channel assignment based upon the user terminal information to the terminal, wherein the terminal is configured to transmit the packets over a channel based on the channel assignment;

wherein the terminal receives an unsolicited grant message that pre-allocates resources of the radio communication system to permit the terminal to transmit a control message.

4. The system according to claim 3, wherein the control message includes an upper layer protocol acknowledgement.

5. A computer-readable medium carrying one or more sequences of one or more instructions for establishing a communication channel in a packet radio communication system to exchange packets, the one or more sequences of one or more instructions including instructions which, when executed by one or more processors, cause the one or more processors to perform the steps of:

receiving a packet channel request message that specifies user terminal information from a terminal over a contention channel according to a prescribed protocol;

transmitting an assignment message that specifies a channel assignment based upon the user terminal information, wherein the packets are transmitted over a channel according to the channel assignment;

transmitting an unsolicited grant message that pre-allocates uplink resources of the packet radio communication system to the terminal; and receiving a control message based upon the step of transmitting the unsolicited grant message.

6. The computer readable medium according to claim 5, wherein the control message in the step of receiving the control message includes an upper layer protocol acknowledgement.

7. A satellite communication system for establishing a communication channel to exchange packets, the system comprising:

means for receiving a packet channel request message that specifies user terminal information from a terminal over a contention channel according to a prescribed protocol;

means for transmitting an assignment message that specifies a channel assignment based upon the user terminal information, wherein the packets are transmitted over a channel according to the channel assignment;

means for transmitting an unsolicited grant message that pre-allocates uplink resources of the packet radio communication system to the terminal; and means for receiving a control message based upon the unsolicited grant message.

8. The system according to claim 7, wherein the control message includes an upper layer protocol acknowledgement.

* * * * *